United States Patent [19]

Delfino

[11] Patent Number: 5,476,286
[45] Date of Patent: Dec. 19, 1995

[54] EXTENSION BRACKET FOR ATTACHING A SEAT-BELT GUIDE

[76] Inventor: Nicholas A. Delfino, 2403-J3 Antigua Cir., Coconut Creak, Fla. 33066

[21] Appl. No.: 321,741

[22] Filed: Oct. 21, 1994

[51] Int. Cl.⁶ .................................................. B60R 22/20
[52] U.S. Cl. ...................................... 280/801.2; 297/482
[58] Field of Search ........................... 280/801.2, 808, 280/801.1; 297/482, 483, 468

[56] References Cited

U.S. PATENT DOCUMENTS

| | | | |
|---|---|---|---|
| 3,964,798 | 6/1976 | Burleigh | 280/801.2 |
| 4,611,825 | 9/1986 | Patterson | 280/801.2 |
| 4,671,468 | 6/1987 | Naito et al. | 280/801.2 |
| 4,940,254 | 7/1990 | Ueno | 280/801.2 |

FOREIGN PATENT DOCUMENTS

| | | | |
|---|---|---|---|
| 0144361 | 10/1980 | Germany | 280/801.2 |
| 3740937 | 6/1989 | Germany | 280/801.2 |
| 0178249 | 8/1986 | Japan | 280/801.2 |

*Primary Examiner*—Margaret A. Focarino
*Assistant Examiner*—Peter C. English
*Attorney, Agent, or Firm*—Ronald V. Davidge

[57] ABSTRACT

An extension bracket is provided to vary the distance between the upper guide of a vehicle seat belt system and the upper anchor to which this guide is attached. Variation of this distance changes the angle at which the shoulder restraint portion of the seat belt system pulls across the driver or passenger in the vehicle. The extension bracket preferably provides adjustment by allowing the upper guide to be attached in one of a number of positions. A decorative cover is provided for attachment to the extension bracket.

3 Claims, 3 Drawing Sheets

EXTENSION BRACKET FOR ATTACHING A SEAT-BELT GUIDE

BACKGROUND OF THE INVENTION

1. Field of the Invention

This invention relates to vehicle seat belts, and more particularly, to a means for adjusting the shoulder restraint portion of a vehicle seat belt for individual comfort.

2. Background Information

The first seat belts in common use on passenger automobiles in the United States were simple lap belts which could easily be adjusted for length by sliding a portion of the buckling mechanism along one of these belts. As belts of this kind were gaining popularity, it became apparent that more lives could be saved and more injuries could be prevented through the addition of a shoulder belt. For example, automobile racing drivers using both lap belts and a shoulder harness could often survive severe crashes without serious injury. Thus, the shoulder belt was added to the lap belt of the American passenger car. Typically, the shoulder belt, like the lap belt, stretched between two anchor points in the vehicle, with a buckle system which could be adjusted to vary the effective length of the belt. While the independent length adjustments of the lap and shoulder belts made it easy to perform these adjustments as required for the individual driver or passenger, a problem was typically encountered in that the angle at which the shoulder belt pulled across the body of the driver or passenger could not be adjusted, since the two anchor positions of the shoulder belt were at fixed locations in the vehicle. The use of these locations sometimes meant that the shoulder belt would pull across the side of the neck of the driver or passenger. Many people who felt the shoulder belts were uncomfortable, or that they were too much trouble, simply did not use them. A method for simplifying the use of the shoulder belt, together with means for providing additional adjustability was needed.

The next generation of belts used on automobiles and other vehicles combined the functions of lap and shoulder belts. In a popular type of belt assembly, a first web of belt material was fed downward from an upper reel, across the outer shoulder of the driver or passenger, to a buckle mechanism fastened to an anchor point near the center of the vehicle. A second web of belt material was fed upward from a lower reel, across the lap of the driver or passenger, to the same buckle mechanism. Thus, while separate reels were required to provide for the supply and tension control of the shoulder belt web and the lap belt web, the operation of a single buckle mechanism by the user held both webs in place. While a method was still not provided for varying the angle at which the shoulder belt extended across the user, a feature in the reel mechanism used to tension this belt allowed the user to release the tension of the shoulder belt by pulling it away from his chest. In this way, someone who was bothered by the angle of the shoulder belt could at least alleviate the problem by producing slack in the belt. Unfortunately, the gap resulting from this slack was found to reduce substantially the effectiveness of the shoulder belt for preventing death and injuries in accidents.

The present generation of seat belts uses a single web of belt material to form both a lap belt and a shoulder restraint. Adjacent to the outside edge of the seat, the web of belt material extends upward from a reel to an upper guide fastened to an upper anchor. From the upper guide, the web also extends downward and inward from the reel to a lower guide, which is removably fastened to a lower anchor by a latch. From the lower guide, the web extends outward across the seat to a lower anchor. While this system maintains tension in both the shoulder restraint and in the portion of the belt extending across the lap, sufficient adjustment is not provided for comfortable use. Particular problems are encountered by many individuals in the use of the shoulder restraint portion of the seat belt system, due to the fact that this portion crosses their bodies too close to their necks. Many people cite this type of discomfort as a reason for not wearing their belts. What is still needed is a means to adjust the angle at which the shoulder restraint lies across the body of a driver or passenger.

SUMMARY OF THE INVENTION

In accordance with one aspect of the invention, there is provided an extension bracket for increasing the distance between an upper anchor and an upper guide through which a seat belt web is mounted to slide. The upper anchor includes an anchor pivot mechanism, and the upper guide includes a guide pivot mechanism which can be engaged with the anchor pivot mechanism. The extension bracket includes an extension plate extending between the anchor pivot mechanism and the guide pivot mechanism, an extension plate pivot mechanism engaging the upper anchor pivot mechanism, mounting the extension plate on the upper anchor, and a guide attachment mechanism, attaching the upper guide to the extension plate.

BRIEF DESCRIPTION OF THE DRAWINGS

Preferred embodiments of the subject invention are hereafter described with specific reference being made to the following Figures, in which.

DETAILED DESCRIPTION

Figure 1:
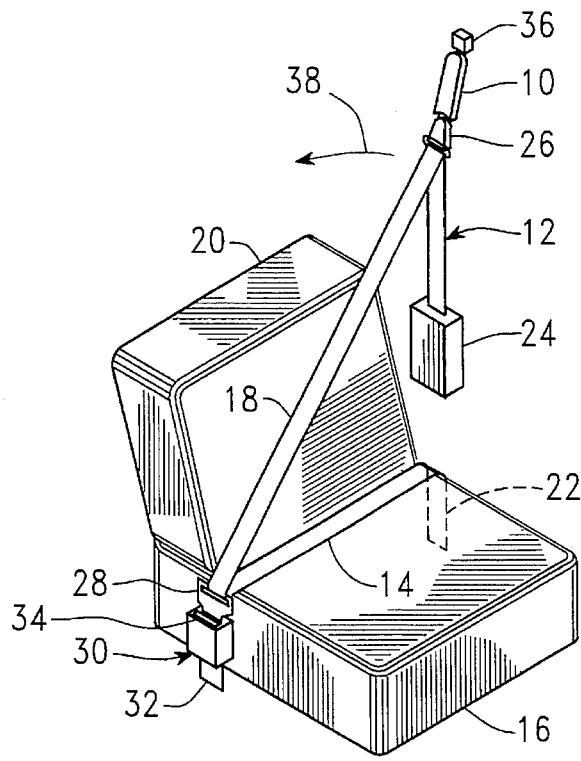
FIG. 1 is an isometric view of an vehicle seat belt assembly including an extension bracket assembly of the present invention, taken as viewed from in front and above.

FIG. 1 is an isometric view of an vehicle seat belt assembly including an extension bracket assembly 10. The belt is formed as a single web 12 including a lower belt portion 14, extending across lower seat 16 to form a lap belt, and an upper belt portion 18, extending across seat back 20 to form a shoulder restraint. An end portion 22 of web 12 extends downward to be anchored to the structure of the vehicle. During the processes of putting the seat belt assembly on the user and of removing it from the user, the web 12 is fed from, and returned into, a supply reel mechanism 24 as the web 12 slides within an upper guide 26 and a lower guide 28. Lower guide 28 is latched in place within a latching mechanism 30, which includes a tab 32 extending downward to be anchored to the structure of the vehicle and a pushbutton which may be used to released lower guide 28. Upper guide 26 is fastened to an upper anchor 36 by means of extension bracket 10.

Without extension bracket 10, upper guide 26 is fastened directly to upper anchor 36. When such an assembly without bracket 10 is compared to the assembly of FIG. 1, a rotation of upper belt portion 18 in the direction of arrow 38 about lower guide 28 is noted. This rotation moves the belt portion 18 toward the neck of an individual (not shown) sitting on lower seat 16 with his back on seat back 20. For many individuals, this rotation causes the belt to press on the neck, resulting in discomfort. Thus, the use of extension bracket 10 as shown in FIG. 1 provides a clearance between belt portion 18 and the neck of the individual driver or passenger, as required for comfort. When compared to the background art method for providing adjustment of the shoulder restraint portion of a seat belt assembly, in which the user was allowed to form slack in the shoulder restraint portion, the present invention has the advantage of retaining tension throughout the belt system, as required to provide optimum protection against injury and death in the event of an accident.

Figure 2:
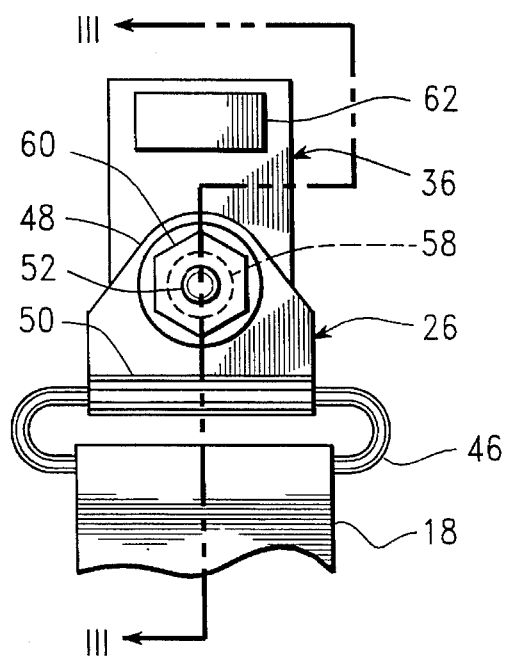
FIG. 2 is a side elevational view of structures within prior-art devices used to slideably mount a seat belt web at an upper and outer location.
Figure 3:
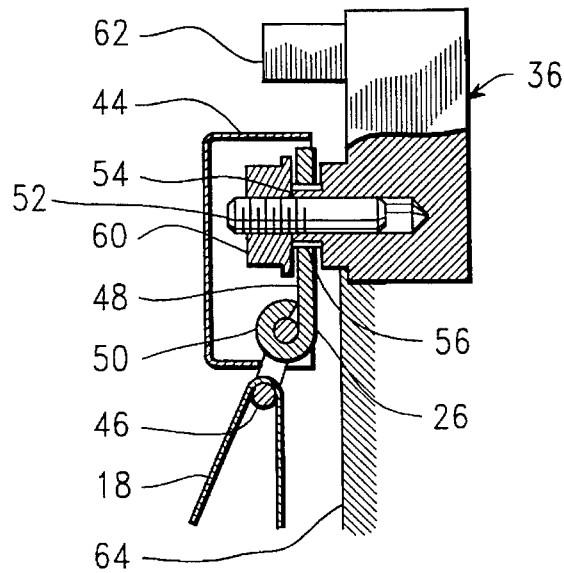
FIG. 3 is a vertical cross-sectional view of the structures of FIG. 2, taken as indicated by section lines III—III in FIG. 2.

This prior-art version of a vehicle seat belt assembly without extension bracket 10 will now be discussed in greater detail, with particular reference being made to FIGS. 2 and 3. FIG. 2 is a side elevational view of upper guide 26 fastened directly to upper anchor 36. FIG. 3 is a vertical cross-sectional view of the devices of FIG. 2, taken as indicated by section lines III—III in FIG. 2. An upper guide cover 44 is shown in FIG. 3 but not in FIG. 2 in order to avoid obscuring the structure of FIG. 2.

Referring to FIGS. 2 and 3, upper guide 26 and upper anchor 36 form portions of the vehicle structure (otherwise not shown) used to slideably mount belt web 18, which extends through an extended loop 46 of upper guide 26. Upper guide 26 otherwise includes a guide plate 48 having an end portion 50 rolled around a side of loop 46 to hold the loop in place. Upper anchor 36 includes a threaded pin 52 extending from an external cylindrical portion 54, on which a plastic sleeve 56 is rotatably mounted. Guide plate 48 is pivotally held in place on cylindrical portion 54, with sleeve 56 within a hole 58 of plate 48, by means of a nut 60 engaging threaded pin 52. Cylindrical portion 54 extends beyond sleeve 56, so that sleeve 56 is not clamped as nut 60 is tightened. Upper anchor 36 may be movable along a track within the vehicle with the depression of a release button 62. The interior surface of the vehicle extends downward as indicated by line 64.

Figure 4:
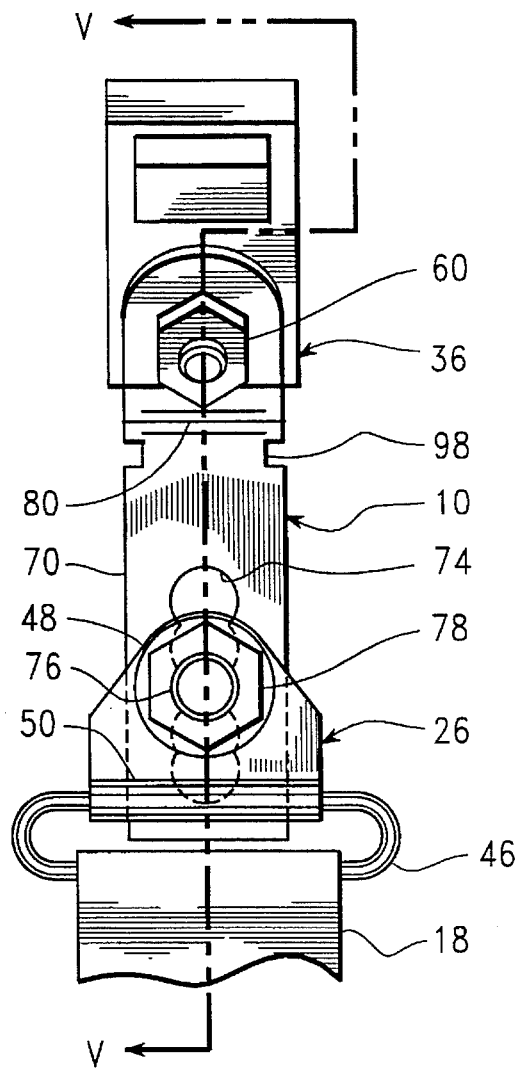
FIG. 4 is side elevational view of structures within the extension bracket assembly of FIG. 1, together with associated hardware.
Figure 5:
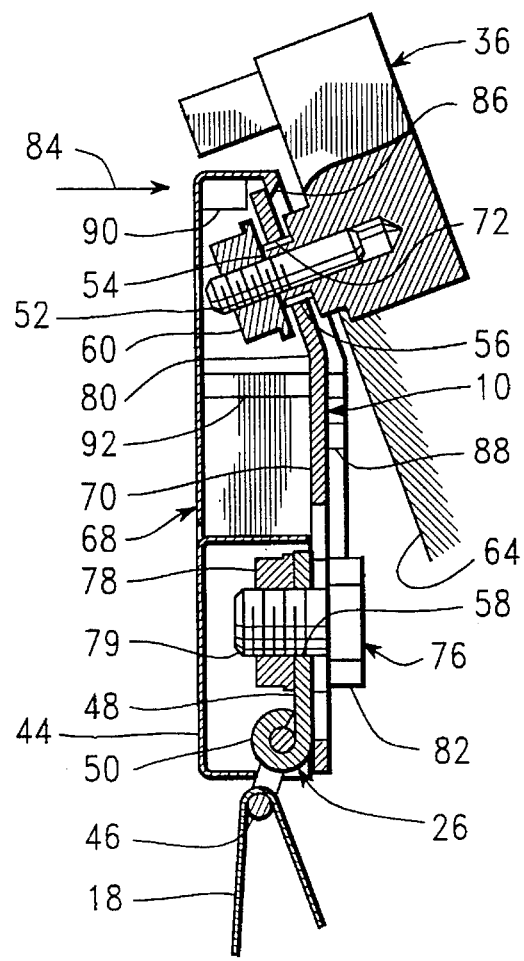
FIG. 5 is a vertical cross-sectional view of the structures of FIG. 4, taken as indicated by section lines V—V in FIG. 2.

The inner structure of extension bracket assembly 10 and associated hardware will now be discussed, with particular reference being made to FIGS. 4 and 5. FIG. 4 is a side elevational view of extension bracket 10, upper guide 26, and upper anchor 36. FIG. 5 is a vertical cross-sectional view taken as indicated by section lines V—V in FIG. 4. Upper guide cover 44 and an extension bracket cover 68, both of which are shown as cross-sectional portions in FIG. 5, are not shown in FIG. 4 because their presence would obscure the internal structure.

Referring to FIGS. 4 and 5, upper guide 26 and upper anchor 36 are preferably used without modification. Extension bracket 10 includes a plate 70 having a pivot hole 72 at an upper end, through which sleeve 56 extends, and a scalloped aperture 74 at a lower end, through which a number of positions are provided for the attachment of upper guide 26 by means of a bolt 76 and a nut 78. Bolt 76 and nut 78 preferably form a self-locking fastening means, including, for example, an elastomeric insert held between the threaded surfaces to prevent loosening. The diameter of threaded portion 79 of bolt 76 is larger than that of threaded pin 52, since bolt 76 must fit within hole 58 of upper guide 26. As previously discussed in reference to FIGS. 2 and 3, sleeve 56 must also fit through this hole 58.

Thus, extension bracket 10 provides a way for substantially increasing the distance between upper guide 26 and upper anchor 36. The amount of this increase in distance is determined by the portion of scalloped aperture 74 through which bolt 76 is inserted. This aperture 74 provides several positions at which the bolt may be inserted, while preventing movement of the inserted bolt between these positions. As nut 78 is tightened on bolt 76, upper guide 26 is preferably held in alignment with plate 70. Plate 70 includes a bend 80, insuring that a clearance is provided between the head 82 of bolt 76 and internal vehicle surface 64 by curving the plate 70 inward, toward the center of the vehicle.

Figure 6:
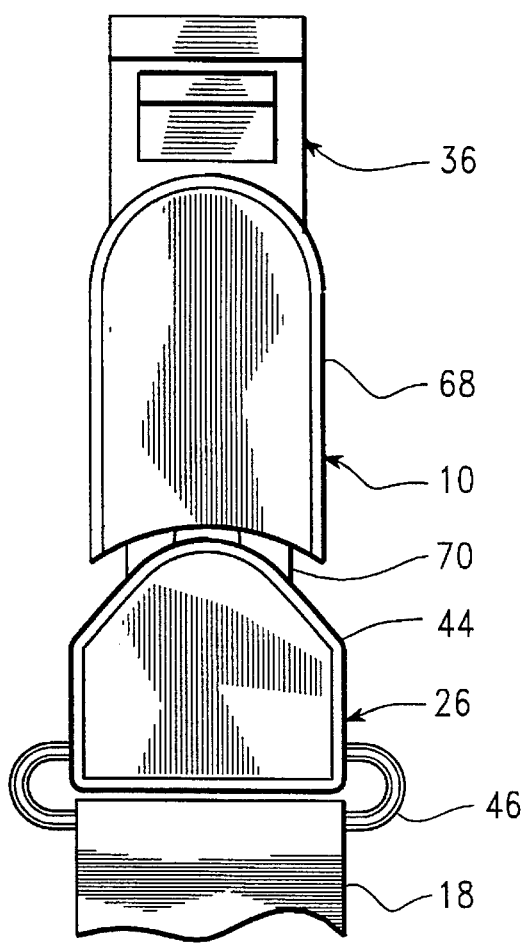
FIG. 6 is a side elevational view of the structures of FIG. 4 with an extension bracket cover and an upper guide cover in place.
Figure 8:
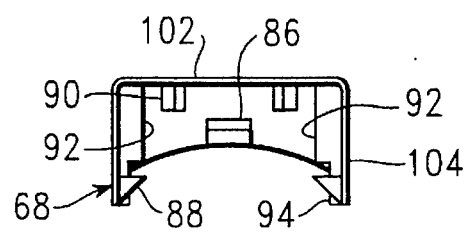
FIG. 8 is an underneath plan view of the extension bracket cover of FIG. 6.
Figure 7:
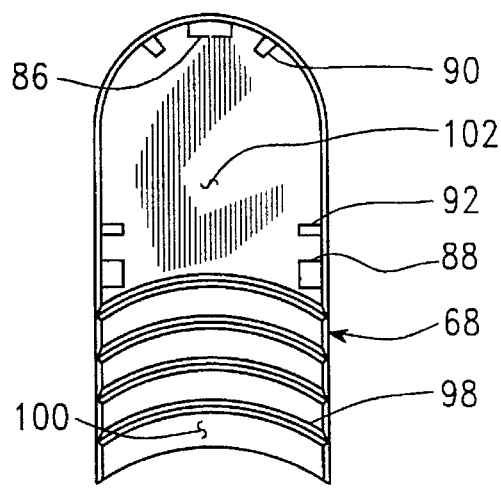
FIG. 7 is an internal side elevational view of the extension bracket cover of FIG. 6.

A decorative cover 68 to be snapped in place over the structure of extension bracket 10 will now be discussed, with continuing reference being made to FIG. 5, and with additional reference being made to FIGS. 6–8. FIG. 6 is a side elevational view of an assembly including upper guide 26, with upper guide cover 44 in place, and extension bracket 10, with extension bracket cover 68 in place. These covers 44 and 68 extend over and around most of the structure shown in FIG. 4. FIG. 7 is an internal elevational view of extension bracket cover 68. FIG. 8 is an underneath plan view of the cover 68.

Referring to FIGS. 5–8, bracket cover 68 is preferably a flexible molded plastic part, which is snapped onto bracket plate 70 in the direction of arrow 84, to be held in place by integral end latching surface 86 and by integral side latching surfaces 88. End support ribs 90 and side support ribs 92 limit the movement of bracket cover 68 in the direction of arrow 84, providing stability as the cover is latched into place on plate 70. Side support ribs 92 include narrowed portions 94 which can slide in grooves 96 (shown in FIG. 4) of plate 70.

Referring particularly to FIG. 7, because of the variation in distance between upper guide 26 and anchor 36 allowed through the use of the multiple positions for bolt 76 in scalloped aperture 74 (as previously described in reference to FIG. 4), a means for varying the length of bracket cover 68 are provided through the use of a number of break-away grooves 98, which allow the separation of individual end sections 100 from the remainder of the cover. These grooves 98 extend nearly through side wall 102 and wrap-around end wall 104, allowing the sections 100 to be easily snapped off as desired. The width of each end section 100 corresponds to the change in the distance between upper guide 26 and upper anchor 36 as threaded portion 79 of bolt 76 is inserted through an adjacent position within scalloped aperture 74.

The various elements described above can be assembled, during the process of assembling a vehicle, into the form shown in FIGS. 5 and 6. Alternately, modifications may be made to achieve this form by adding extension bracket 10 to an existing arrangement assembled generally as shown in FIG. 3. This type of modification will now be described, with particular references being made to FIGS. 3–5.

Referring again to FIG. 3, to perform this type of modification, upper guide cover 44 is first pulled off to expose nut 60. Nut 60 is next removed to separate upper guide 26 from upper anchor 36. Seat belt web 18 remains attached through loop 46 of guide 26.

Referring again to FIGS. 4 and 5, upper guide 26 is next assembled to bracket plate 70 by placing the treaded portion 79 of bolt 76 into the position within scalloped aperture 74 corresponding to the lengthening desired in the distance between upper guide 26 and upper anchor 36. Nut 78 is then tightened on bolt 76, as upper guide 26 is held in alignment with bracket plate 70. Next, bracket plate 70 is placed on upper anchor 36, with bearing sleeve 56 extending through pivot hole 72, and nut 60 is returned to full engagement with threaded pin 52. Finally, bracket cover 68 is snapped in place on bracket plate 70 in the direction of arrow 84.

Figure 9:
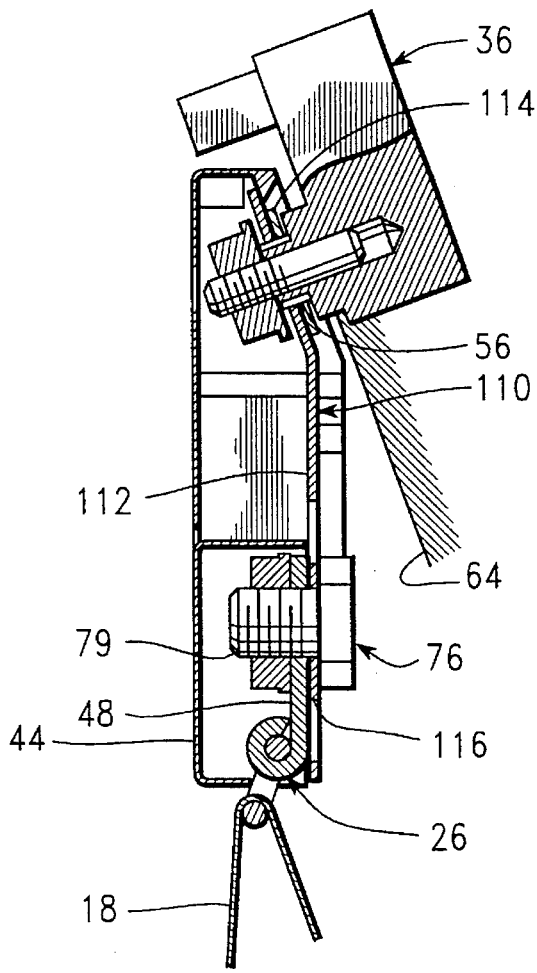
FIG. 9 is a vertical cross-sectional view of an alternate extension bracket assembly built in accordance with the present invention.

FIG. 9 is a vertical cross-sectional view of an alternate extension bracket 110 built in accordance with the present invention. This bracket 110 includes an alternate bracket plate 112 which is substantially thinner than guide plate 48. This difference in thickness is accommodated through the use of a spacing washer 114 placed over bearing sleeve 56 adjacent to the plate 112. The scalloped aperture 74 (shown in FIG. 4) is replaced by a series of individual holes 116, into which the threaded portion 79 of bolt 76 may be inserted. These features of alternate extension bracket 110 may be applied individually to extension bracket 10.

Referring again to FIG. 3, while the invention has been described in a particular application to a vehicle having an anchor with a removable nut 60, the invention may also be applied to a vehicle having a different type of pivot, which must be removed, for example, by a pulling or machining process. In a vehicle having an upper anchor located in an adjustable manner, the use of the present invention increases the range of adjustment provided; in a vehicle with an upper anchor located at a fixed position, the use of the present invention provides a range of adjustment.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. An extension bracket for increasing the distance between an upper anchor, including anchor pivot means, and an upper guide, including guide pivot means engageable to said anchor pivot means for pivotally mounting said upper guide on said upper anchor, wherein a seat belt web extends slidably through said upper guide, and wherein said extension bracket comprises:

an extension plate extending between said anchor pivot means and said guide pivot means;

extension plate pivot means engaging said anchor pivot means for pivotally mounting said extension plate on said upper anchor;

guide attachment means for attaching said upper guide to said extension plate, wherein said guide attachment means attaches said upper guide to said extension plate in a plurality of positions varying a distance between said upper anchor and said upper guide: and a decorative cover attached to said extension plate, wherein said decorative cover includes a number of separable sections allowing variation of a length of said decorative cover in correspondence with said distance between said upper anchor and said upper guide.

2. Apparatus guiding a seat belt in a vehicle, wherein said apparatus comprises:

an upper anchor, including anchor pivot means, attached to a structural surface of said vehicle;

an extension bracket with bracket pivot means pivotally engaging said anchor pivot means;

an upper guide, including a belt aperture through which a web of seat-belt material can slide and guide fastening means which can be engaged with said anchor pivot means;

bracket fastening means attaching said extension bracket to said guide fastening means in a plurality of locations along said extension bracket: and a decorative cover attached to said extension bracket, wherein said decorative cover includes a plurality of removable segments corresponding to a distance between said upper anchor and said upper guide as said guide fastening means is fastened to said extension bracket in said plurality of locations.

3. In a seat belt apparatus for a vehicle, wherein said apparatus comprises a reel feeding a web through an upper, guide adjacent to an outer side of a seat and through a lower guide adjacent to an inner side of said seat, said upper guide being held in place by an upper anchor fastened to a structural portion of said vehicle, an improvement comprising:

an extension bracket extending between said upper anchor and said upper guide, said extension bracket being pivotally mounted on said upper anchor, said upper guide being attached to said extension bracket, wherein said upper guide attaches to said extension bracket in a plurality of positions allowing variation of a distance between said upper anchor and said upper guide; and, a decorative cover attached to said extension bracket, wherein said decorative cover includes a number of separable sections allowing variation of a length of said decorative cover in correspondence with said distance between said upper anchor and said upper guide.

* * * * *